(12) United States Patent
Tanaka

(10) Patent No.: US 7,770,302 B2
(45) Date of Patent: Aug. 10, 2010

(54) SENSOR

(75) Inventor: Makoto Tanaka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 127 days.

(21) Appl. No.: 12/271,995

(22) Filed: Nov. 17, 2008

(65) Prior Publication Data

US 2009/0133277 A1 May 28, 2009

(30) Foreign Application Priority Data

Nov. 22, 2007 (JP) .............................. 2007-302910

(51) Int. Cl.
*G01B 5/016* (2006.01)
*G01B 5/004* (2006.01)
(52) U.S. Cl. .......................... 33/561; 33/559
(58) Field of Classification Search ................... 33/556, 33/558, 559, 561
See application file for complete search history.

(56) References Cited

U.S. PATENT DOCUMENTS

| 4,462,162 | A | * | 7/1984 | McMurtry | 33/561 |
| 4,625,417 | A | * | 12/1986 | Cusack | 33/556 |
| 4,660,296 | A | * | 4/1987 | Klingler et al. | 33/559 |
| 5,018,278 | A | | 5/1991 | Aehnelt et al. | |
| 5,819,429 | A | * | 10/1998 | Matsuhashi | 33/558 |
| 6,131,301 | A | * | 10/2000 | Sutherland | 33/561 |
| 6,459,281 | B1 | * | 10/2002 | Carli | 33/561 |
| 6,523,273 | B1 | | 2/2003 | Nishioki et al. | |
| 7,464,484 | B2 | * | 12/2008 | Schopf | 33/561 |
| 2006/0260148 | A1 | * | 11/2006 | Baruchello et al. | 33/561 |

FOREIGN PATENT DOCUMENTS

| DD | 247 573 | 9/1987 |
| EP | 0 379 682 | 8/1990 |
| EP | 1 061 327 | 12/2000 |
| JP | 5-223511 | 8/1993 |
| JP | 7-3902 | 1/1995 |

OTHER PUBLICATIONS

European Search Report issued Feb. 24, 2009 in EP 08 02 0042, which is a foreign counterpart to the present application.

* cited by examiner

*Primary Examiner*—G. Bradley Bennett
(74) *Attorney, Agent, or Firm*—Wenderoth, Lind & Ponack, L.L.P.

(57) ABSTRACT

To provide a sensor having a long operational life. A sensor which senses contact with an object through tilting of a probe having a rod shape, the sensor including: a housing having a hollow columnar shape; the probe arranged to project from an inside of the housing to an outside of the housing, and capable of reciprocating and tilting with respect to the housing; connectors fixed to a part of the probe, which is located inside the housing; terminals fixed to positions inside the housing that come into contact with the connectors, and which conduct electricity through the contact with the connectors; a probe biasing unit configured to force the probe along a direction of the reciprocation so that the connectors come into contact with the terminals; and a releasing unit configured to release the contact between the connectors and the terminals brought upon by the probe biasing unit.

6 Claims, 13 Drawing Sheets

SENSOR

BACKGROUND OF THE INVENTION (1) Field of the Invention

The present invention relates to sensors, and particularly to a sensor which senses contact between a probe and an object.

(2) Description of the Related Art

FIG. 9 is an external perspective view showing an example of a commonly-used conventional turret lathe. As shown in the figure, a turret lathe 1 includes a spindle 2 and a turret 3.

The spindle 2 is supported by a headstock 5 provided on a head 4, and holds and rotates a workpiece (not shown) through a spindle chuck 6.

The turret 3 includes a turret tool post 7, an indexing mechanism 8, and a turret slide 9.

The turret tool post 7 has tool holding faces 10 around a rotating shaft, and is rotatably supported by the indexing mechanism 8. On each the tool holding faces 10, a tool 11 such as a tool bit or drill is inserted via a tool station 11a.

It should be noted that the straight line connecting the rotational axis of the spindle 2 and the rotational axis of the turret tool post 7 is parallel with the X-axis (in the horizontal plane) shown in the figure.

The indexing mechanism 8 is provided on the turret slide 9, and, through a motor, rotates the turret tool post 7. As a result, the indexing mechanism 8 positions a specific tool holding face 10 on the workpiece side.

FIG. 10 is an elevation view showing a positional relationship between the turret tool post 7 and the spindle 2 of the turret lathe 1. FIG. 11 is an elevation view showing the movable range and maximum turning radius R of the turret tool post of the turret lathe.

As shown in FIG. 10, a tool 11 selected for the machining of a workpiece 12 is aligned to a cutting position by being rotated at the maximum turning radius R of the turret tool post 7. Here, a cutting position is a position at the workpiece 12 side, which is on the straight line which passes the rotational axis of the spindle 2 and is parallel to the X-axis.

The indexing mechanism 8 can, through a motor, move the turret tool post 7 in a Z-axis direction which is a direction that is parallel to the rotational axis of the spindle 2.

The turret slide 9 is provided on the bed 4 to be movable along the X-axis direction. The turret slide 9 moves along the X-axis direction together with the turret tool post 7 and the indexing mechanism 8 through a motor. As a movable range, the turret slide 9 moves through a range in which the tool 11 extends slightly beyond the rotational axis of the spindle 2.

Through the indexing mechanism 8 and the turret slide 9, the turret tool post 7 can move in the X-axis direction and the Z-axis direction. Therefore, the indexed tool can perform machining on the workpiece 12 held in the rotating spindle 2, in the radial direction and the axial direction.

The above described structure is normally placed in a housing (not shown), and workpieces are machined therein.

Here, some machine tools such as turret lathes have a function for measuring the dimensions of a workpiece in the machine tool, without having to remove the workpiece from the spindle. This function enables the dimension measurement to be performed without having to take a workpiece out of the machine tool, and thus the work efficiency of the machine tool improves. Further, by measuring displacement of workpieces and/or displacement of the machine tool caused by changes in the in-machine environment such as a variation in the temperature, and by calibrating a control amount for the machine tool according to the measured displacement, it is possible to ensure highly accurate product dimensions.

For example, a turret lathe 1 is available which has a function for measuring the diameter, and so on of the workpiece 12, using a sensor mounted on a tool holding face 10 of the turret tool post 7, through a tool station 11a or through similar fitting equipment.

Furthermore, as disclosed in Japanese Unexamined Utility Model Application Publication No. 07-3902, a turret lathe has been proposed which has a mechanism for directly measuring the diameter of a workpiece by measuring the position of both ends of the workpiece.

FIGS. 12A and 12B are schematic diagrams each showing an example of the conventional turret tool post 7 having a mechanism for directly measuring the diameter of the workpiece 12. FIG. 12A is an anterior view and FIG. 12B is a top view.

The turret lathe 1 shown in FIGS. 12A and 12B includes, at the front of the turret tool post 7, an arm 15 which is rotatably supported by a non-rotating member at the center of the turret tool post 7. Further, a sensor 20 is mounted at the tip of the arm 15.

The length of the arm 15 is sufficient for the sensor 2 to measure the position of one end (P2) of the diameter of the workpiece 12 out of both ends (P1 and P2), which is on a side opposite to the turret tool post 7 with the rotational axis of the spindle 2 located therebetween, when the turret tool post 7 approaches the spindle 2.

By adopting such a structure, the turret lathe 1 is capable of measuring the positions of both ends P1 and P2 of the diameter of the workpiece 12 as shown in FIG. 12B. The diameter of the workpiece 12 can be derived from the difference between P1 and P2 obtained in such a manner.

The structure of the conventional sensor 20 used in the in-machine measurement of such turret lathes shall be described with reference to the drawings.

FIG. 13 is a cross-section view showing an example of the structure of a conventional sensor used in in-machine measurement.

The sensor 20 is a sensor which senses contact with an object through the tilting of a rod-shaped probe, and includes a housing 22, a probe 24, a connectors 26a, 26b, and 26c, terminals 28, 29, and 30, and a spring 25.

The housing 22 is a hollow columnar housing which internally houses the respective parts. The housing 22 is mounted directly onto fitting equipment such as the tool station 11a.

The probe 24 is a rod-shaped rigid body that is positioned so as to project from the inside to the outside of the housing 22, and is provided so as to allow tilting with respect to the housing 22.

The spring 25 has a biasing force in a direction which distances the probe 24 from one surface of the housing 22. Furthermore, although such biasing force pushes the connectors 26a, 26b, and 26c into contact with the terminals 28, 29, and 30, respectively, the biasing force is such that the contact between at least one of the connectors 26a, 26b, 26c, and terminals 28, 29, 30 is released by even the slightest contact between the tip of the probe 24 and the workpiece 12.

The connectors 26a, 26b, and 26c are three columnar metal members that can maintain conduction through contact with the terminals 28, 29, and 30, respectively, and which are fixed to the middle portion of the probe 24. The connector 26a (26b, 26c) is fixed perpendicularly with respect to the axis of the probe 24. The connectors 26a, 26b, and 26c are arranged evenly around the same circle, and the angle between neighboring connectors 26a and 26b (26b and 26c, 26c and 26a) is 120 degrees. In other words, the connectors 26a, 26b, and 26c are fixed to the probe 24 so as to form an even radial pattern with respect to the axis of the probe 24.

The terminal 28 (29, 30) is a member that can maintain conduction through contact with the connector 26a (26b, 26c), and is configured of two columnar electrodes 28a and 28b (29a and 29b, 30a and 30b) which are arranged in the shape of the letter V. The two columnar electrodes 28a and 28b (29a and 29b, 30a and 30b) are insulated from each other and from the housing 22, and are mounted on an inner end face of the housing 22, with the open end facing inward. The three terminals 28, 29, 30 are placed in positions corresponding to those of the connectors 26a, 26b, 26c, respectively.

Next, the sensing method of the sensor 20 shall be described.

The sensor 20 has a wiring connection as shown in FIG. 14. More specifically, the electrode 28a (28b) configuring the terminal 28 is wire-connected to the electrode 29a (30a) of the neighboring terminal 29 (30) by a conducting wire 31a (31b). In addition, the connector 26a (26b, 26c) is pushed into contact with the terminal 28 (29, 30). Therefore, as shown in FIG. 15, the two electrodes 28a and 28b are electrically connected through the connector 26a. The two electrodes 29a and 29b (30a and 30b) configuring the other terminal 29 (30) are also electrically connected through the connector 26b (26c) in the same manner. Thus, there is conduction between two outgoing wires 32a and 32b.

Next, when the probe 24 comes into contact with the workpiece 12, the probe 24 tilts with respect to the housing 22. At least one of the connectors, for example, 26a (26b, 26a) fixed to the probe 24 rises from the corresponding terminal 28 (29, 30), with the corresponding remaining terminals 26b and 26c (26c and 26a, and 26a and 26b) as axes. With this, the two columnar electrodes 28a and 28b (29a and 29b, 30a and 30b) become insulated from each other and thus the two outgoing wires 32a and 32b become insulated from each other.

Therefore, by observing whether or not the two outgoing wires 32a and 32b are insulated from each other, it is possible to sense contact between the probe 24 and the workpiece 12. With this, the turret lathe can obtain information indicating the position in the X-axis direction at which the sensor comes into contact with the workpiece, and the dimensions of the workpiece can be measured based on the obtained position information.

However, when a sensor is mounted on a turret tool post, a problem has been discovered in which the operational life of the sensor is significantly shortened due to the vibration generated during the rotation of the turret tool post, the cutting of workpieces by the cutting tools mounted on other positions in the turret tool post, and so on.

SUMMARY OF THE INVENTION

As a result of dedicated efforts and research, the inventors in the present application have determined the cause of the problem is wear due to the rubbing of the movable and fixed parts of the sensor brought about by such vibration.

The present invention is conceived in view of the aforementioned problem and has as an object to provide a sensor having a long operational life.

In order to achieve the aforementioned object, the sensor according to the present invention is a sensor which senses contact with an object through tilting of a probe having a rod shape, the sensor including: a housing having a hollow columnar shape; the probe arranged to project from an inside of the housing to an outside of the housing, and capable of reciprocating and tilting with respect to the housing; connectors fixed to a part of the probe, which is located inside the housing; terminals fixed to positions inside the housing that come into contact with the connectors, and which conduct electricity through the contact with the connectors; a probe biasing unit configured to force the probe along a direction of the reciprocation so that the connectors come into contact with the terminals; and a releasing unit configured to release the contact between the connectors and the terminals brought upon by the probe biasing unit.

With this, the contact between the terminals and the connectors can be released during the period in which the sensor is not in use. As such, there is no rubbing of the terminals and connectors due to some form of vibration. Therefore, the wearing down of the terminals and connectors due to vibration can be prevented, and thus the operational life of the sensor can be prolonged.

In addition, it is preferable that the connectors are fixed to project outward in a radial pattern, with an axis of the probe as a center, and that each of the terminals is made up of a pair of columnar conductors which are insulated from each other, each of the pair of conductors conducting electricity via one of the connectors through contact with the one connector.

With this, a loop circuit is formed through the connection of each of the pair of conductors configuring a terminal and the conductors of a neighboring terminal, via the connectors. With such a circuit, it becomes possible to sense whether or not all of the terminals and connectors are in contact, by sensing the conductance at one location, and thus internal wiring can be made comparatively simple. Therefore, the interference between the connectors and wires when the connectors separate from the terminals no longer needs to be considered, and thus it is possible to simplify the implementation of the alienation of the conductors from the terminals.

In addition, it is preferable that the sensor further includes: a base which can reciprocate inside the housing; and a locking unit provided in the housing, and configured to lock the base to a first position, wherein the connectors are three in number, three of the terminals are respectively fixed to positions at which a corresponding one of the connectors comes into contact, each of the terminals being provided in a V-shape, the probe biasing unit is an elastic body and is configured to connect the base and the probe, and to restrain the tilting of the probe with respect to the base when the base is locked by the locking unit, the releasing unit is configured to switch a position of the base along a direction of the reciprocation, between the first position and a second position which releases the restraint on the tilting of the probe and the contact between the connectors and the terminals, and the base has engaging claws which do not interfere with the tilting of the probe when the base is in the first position, and which engage with the probe when the position of the base is switched from the first position to the second position by the releasing unit.

In this manner, by constructing the pair of conductors configuring each of the terminals in the shape of the letter V, the connector which makes contact can be guided into the valley of the V-shape. With this, it becomes possible to reliably bring a connector into contact with each of the pair of conductors.

Furthermore, the connectors provided on the probe are reliably alienated from the terminals through the engagement of the engaging claws and the probe when the position of the base is switched.

With this, it is possible to reliably prevent the rubbing of the connectors and the terminals when the base is in the second position, and thus the operational life of the sensor can be prolonged.

In addition, it is preferable that the probe has a holding member which engages with a rim of a holding cavity of the housing and holds the probe, when the position of the base is switched to the second position by the releasing unit.

In this manner, the probe is protected when the base is in the second position. As such, the probe is stabilized so as not to vibrate. Therefore, the connectors and the terminals do not come into contact when the base is in the second position. Furthermore, it becomes possible to prevent collision between the probe and the rim of the hole in the housing through which the probe passes caused by vibration reaching the sensor. Therefore, the operational life of the sensor can be prolonged.

In addition, it is preferable that the holding member is a tapered member which fits together with the holding cavity.

In this manner, since the holding member is tapered, it becomes possible to smoothen the fitting together of the holding unit and the holding cavity.

In addition, it is preferable that at least one of the holding cavity and the holding member has a cushioning member which fills a gap arising when the holding cavity and the holding member fit together.

In this mariner, by connecting via the cushioning member, the impact upon fitting together can be softened. Furthermore, the gap arising in the fitted state can be eliminated and, along with being able to prevent the probe from vibrating, the intrusion of dust into the inside of the housing can also be prevented.

The sensor according to the present invention enables the prolonging of the operational life of the sensor.

FURTHER INFORMATION ABOUT TECHNICAL BACKGROUND TO THIS APPLICATION

The disclosure of Japanese Patent Application No. 2007-302910 filed on Nov. 22, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
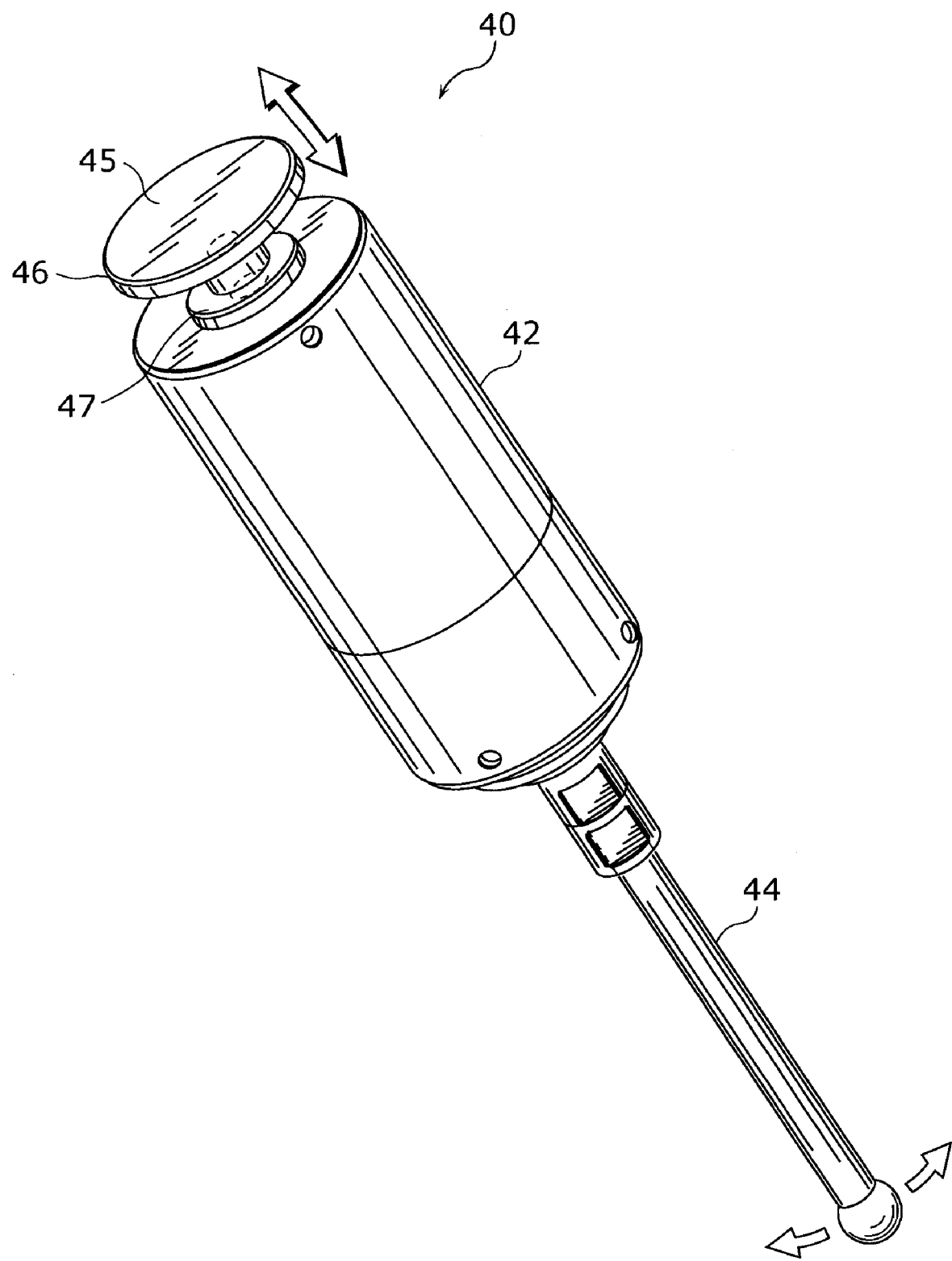
FIG. 1 is a perspective view showing the external appearance of a sensor.

FIG. 1 is a perspective view showing the external appearance of a sensor 40.

The sensor 40 is a sensor which senses contact between the sensor 40 and a workpiece. The outline sensing mechanism of the sensor 40 is as follows. Specifically, a probe 44 included in the sensor 40 tilts when coming into contact with a workpiece. The contact between the sensor 40 and the workpiece is sensed by electrically reading the disconnection of electrical contact points in conjunction with the tilting of the probe 44. The sensor 40 in the present embodiment includes the probe 44, a housing 42, and a releasing unit 45.

The probe 44 is a member that comes into direct contact with a workpiece, and is a member in which a partial sphere is integrally mounted on the tip of a columnar member. The probe 44 is arranged in the form of a projection, extending from inside the housing 42 and passing through one end of the housing 42 Lip to the outside of the housing 42.

The housing 42 is a member that is directly mounted on a tool station, or similar fitting equipment, that is mounted on a tool holding face of the turret tool post. The position of the sensor 40 is determined by the mounting of the housing 42 onto a tool station, and the like. Furthermore, the housing 42 is a member for protecting electrical contact points and other mechanisms, and is a cylinder with a part of both ends covered.

The releasing mechanism 45 is a mechanism that can release the contact between terminals and connectors caused by a probe biasing unit 53 to be described later. The releasing unit 45 is a member that can cause the probe 44 to reciprocate with respect to the housing 42, and switch the probe 44 between the sensing position and the released position. The releasing unit 45 is arranged to project, from the inside of the housing 42, passing through the other end of the housing 42, to the outside of the housing 42. The releasing unit 45 includes, outside the housing 42, a positioning flange 47 and a first engaging flange 46.

The positioning flange 47, which serves as a locking unit, is a member which determines the position of the releasing unit 45 with respect to the housing 42, by coming into contact the other end of the housing 42.

The first engaging flange 46 is a member for transmitting motive power to the releasing unit 45 and reciprocating the releasing unit 45, by engaging with an external mechanism (described later).

Figure 2:
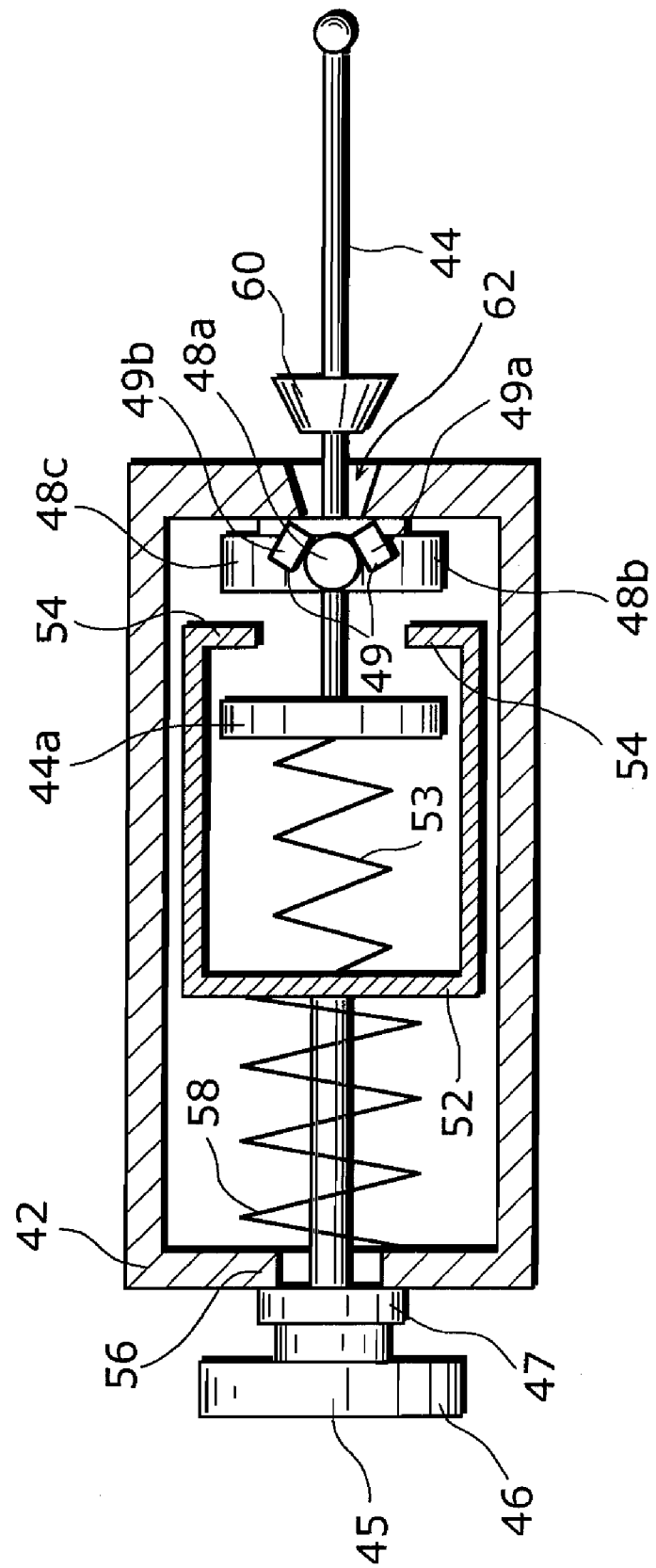
FIG. 2 is a cross-section view schematically showing the inside of the sensor.

FIG. 2 is a cross-section view schematically showing the inside of the sensor 40.

Figure 3:
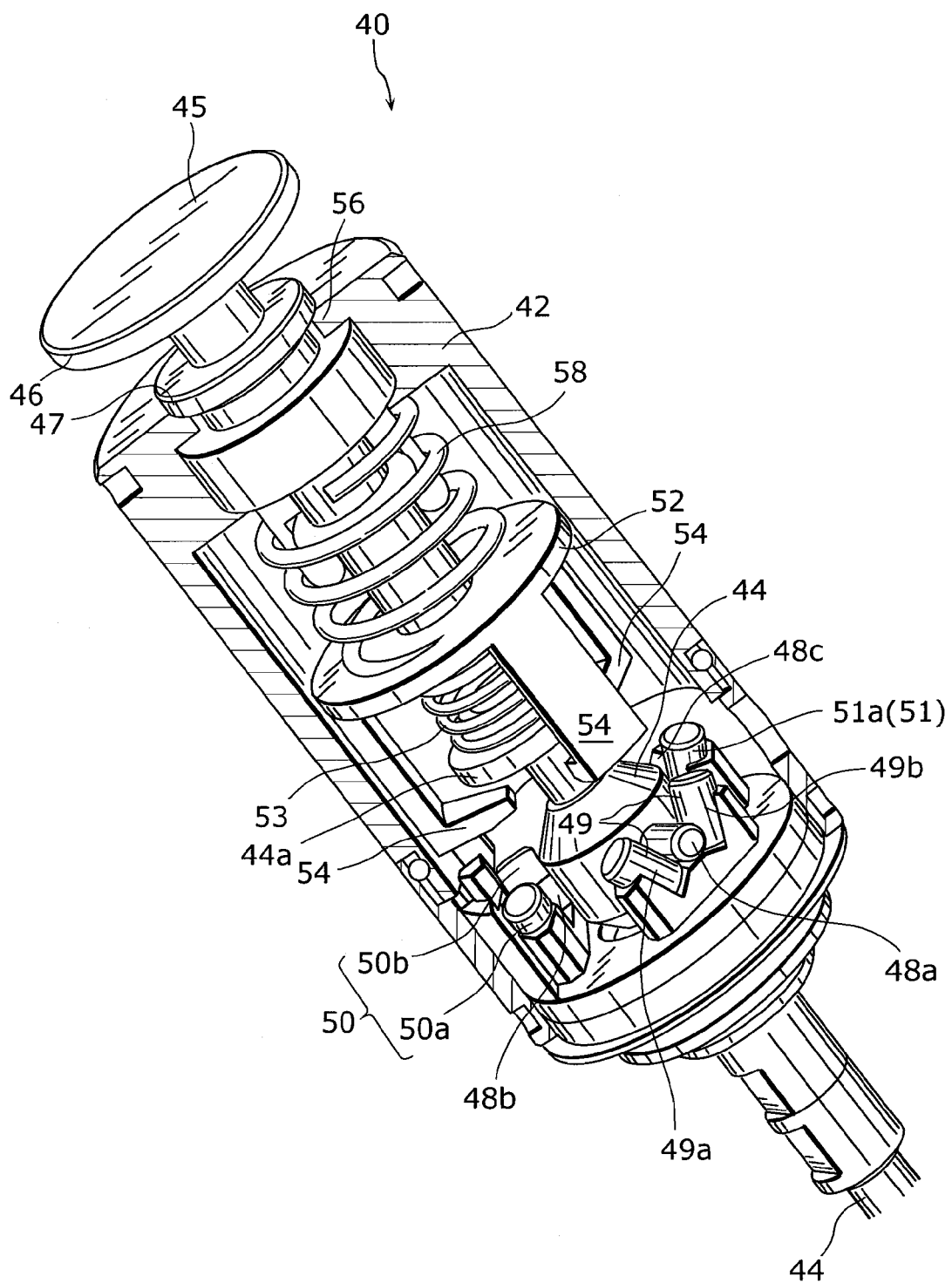
FIG. 3 is a perspective view of a partial cut-out of the sensor, showing the inside thereof.

Furthermore, FIG. 3 is a perspective view of a partial cut-out of the sensor 40 showing the inside thereof.

As shown in the figure, the probe 44 includes, inside the housing 42, connectors 48a, 48b, and 48c, and a second engaging flange 44a. Furthermore, the probe 44 includes, outside of the housing 42, a holding member 60. The housing 42 includes, internally, terminals 49, 50, and 51, and includes, on one end, a holding cavity 62. The releasing unit 45 includes, inside the housing 42, a base plate 52, engaging claws 54, the probe biasing unit 53, and a positioning flange biasing unit 58.

The connectors 48a, 48b, and 48c are three columnar metal members that can maintain conduction through contact with the terminals 49, 50, and 51, respectively, and which are fixed to the middle portion of the probe 44. All of the connectors 48a, 48b, and 48c are fixed perpendicularly with respect to the axis of the probe 44. The connectors 48a, 48b, and 48c are arranged evenly around the same circle, and the connectors 48a, 48b, and 48c form a 120 degree angle between each other. In other words, the connectors 48a, 48b, and 48c are fixed to the probe 44 so as to form an even radial pattern with respect to the axis of the probe 44.

The second engaging flange 44a is a disc-shaped member fixed to the base end of the probe 44, which engages with the engaging claws 54 of the releasing unit 45, and transmits motive power to the probe 44 in the direction in which the probe 44 sinks into the housing 44.

The holding member 60 is a member which fits together with the holding cavity 62 when the probe is at the released position, so that the probe 44 is held steady against the housing 42. The holding member 60 is a truncated cone which tapers towards the housing 42, and is fixed to the middle portion of the probe 44.

The terminal 49 is a member that can maintain conduction through contact with the connector 48a, and is configured of two columnar electrodes 49a and 49b which are arranged in the shape of the letter V. The two electrodes 49a and 49b are insulated from each other and from the housing 42. The two electrodes 49a and 49b are mounted on an inner end face of the housing 42, with the open end facing inward with respect to the reciprocating direction of the probe 44. The terminal 50 and the terminal 51 are members having the same configuration and mounting form as the terminal 49. The terminal 49, the terminal 50, and the terminal 51 are arranged in positions that correspond with the terminal 48a, the terminal 48b, and the terminal 48c, respectively.

The holding cavity 62 is a hole provided at the center of one end face of the housing 42, and having a tapered shape in which the diameter expands in an outward direction. The holding cavity 62 fits together with the holding member 60.

The base plate 52 is a member for reciprocating the releasing unit 45, while sliding smoothly against the housing 42. The base plate 52 includes a disc portion which matches the cross-sectional shape of the inside of the housing 42, and a connecting rod portion for connecting with the positioning flange 47.

The engaging claws 54 are members that engage with the second engaging flange 44a located at the base end portion of the probe 44 and which transmit motive power received through the releasing unit 45 to the probe 44. The engaging claws 54 are key-shaped members which are provided as a set that protrudes from the rim of the base plate 52 in the same direction as the reciprocation of the base plate 52. The engaging claws 54 are provided evenly on the rim of the disc portion of the base plate 52 as 3 claws-in-1 set, with each claw engaging with the second engaging flange 44a so as to allow the probe 44 to be pulled straight along the axis of the housing 42. In the state where the positioning flange 47 is in contact with the housing 42 (sensing position), the engaging claws 54 do not engage with the second engaging flange 44a, and thus do not interfere with the tilting of the probe 44.

The probe biasing unit 53 is a helical spring which pushes the connector 48a (48b, 48c) into light contact with the terminal 49 (50, 51), in the state where the positioning flange 47 is in contact with the housing 42 (sensing position). The probe biasing unit 53 has a biasing force in a direction which distances the probe 44 from the base plate 52. Furthermore, although such force pushes the connectors 48a, 48b, and 48c into contact with the terminals 49, 50, and 51, respectively, the force is such that the contact between at least one of the connectors 48a, 48b, and 48c and the terminals 49, 50, and 51 is released by even the slightest contact between the tip of the probe 44 and a workpiece.

The positioning flange biasing unit 58 serves to keep the positioning flange 47 in contact with the housing 42 (sensing position), and has a biasing force in directions which distance the inner side of the other end of the housing 42 and the opposing base plate 52 from each other. The biasing force of the positioning flange biasing unit 58 is stronger than the biasing force of the probe biasing unit 53, and can maintain the sensing position even when some vibration is applied to the sensor 40.

Next, the sensing method of the sensor 40 shall be described.

Figure 14:
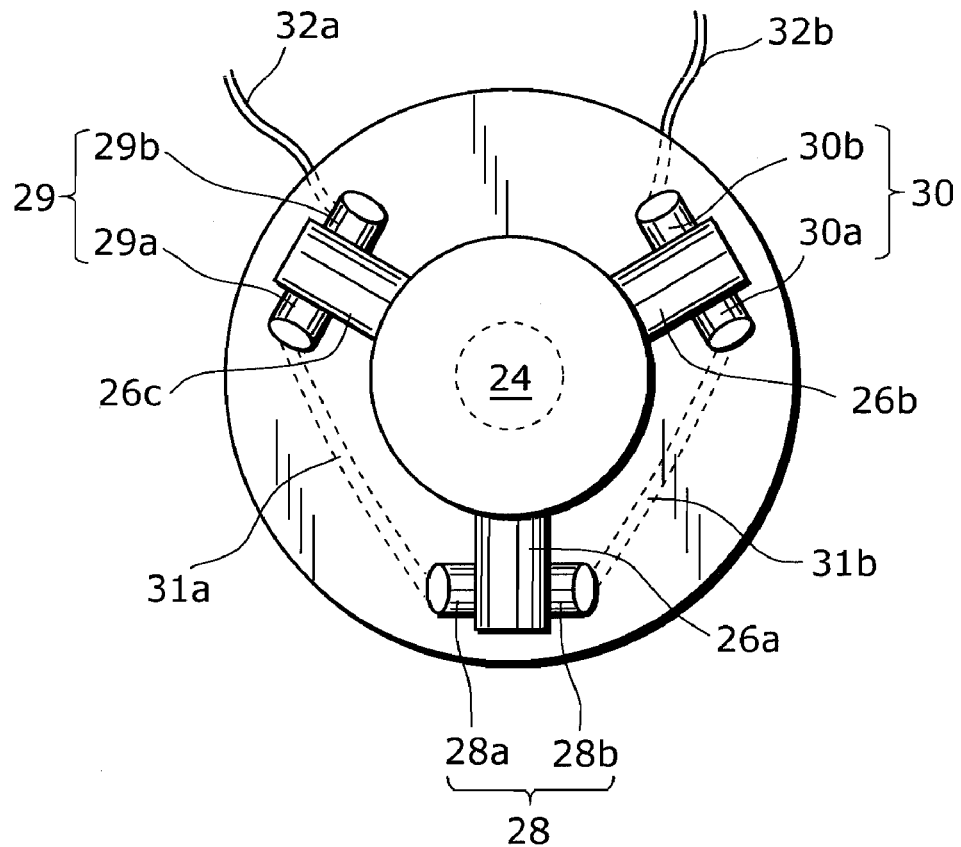
FIG. 14 is a plan view showing the wiring connection of the terminals.
Figure 15:
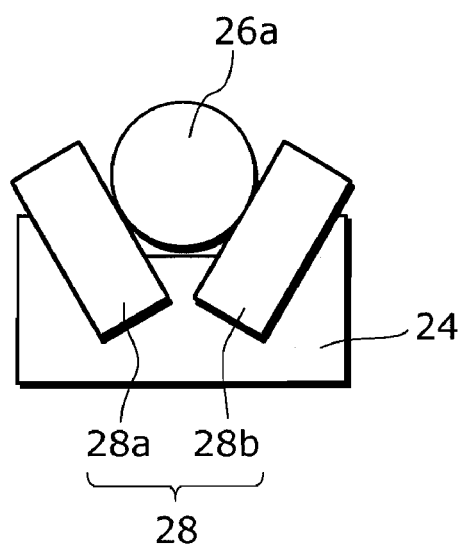
FIG. 15 is a side view showing the appearance of a terminal and a connector.

When the releasing unit 45 of the sensor 40 is in the sensing position, there is no difference with the conventional sensor. As described with reference to FIG. 14 and FIG. 15, contact between the probe 44 and a workpiece can be sensed by observing whether the two outgoing wires are in a conducting or an insulated state with each other.

Next, the protected state of the sensor 40 shall be described.

Figure 4A:
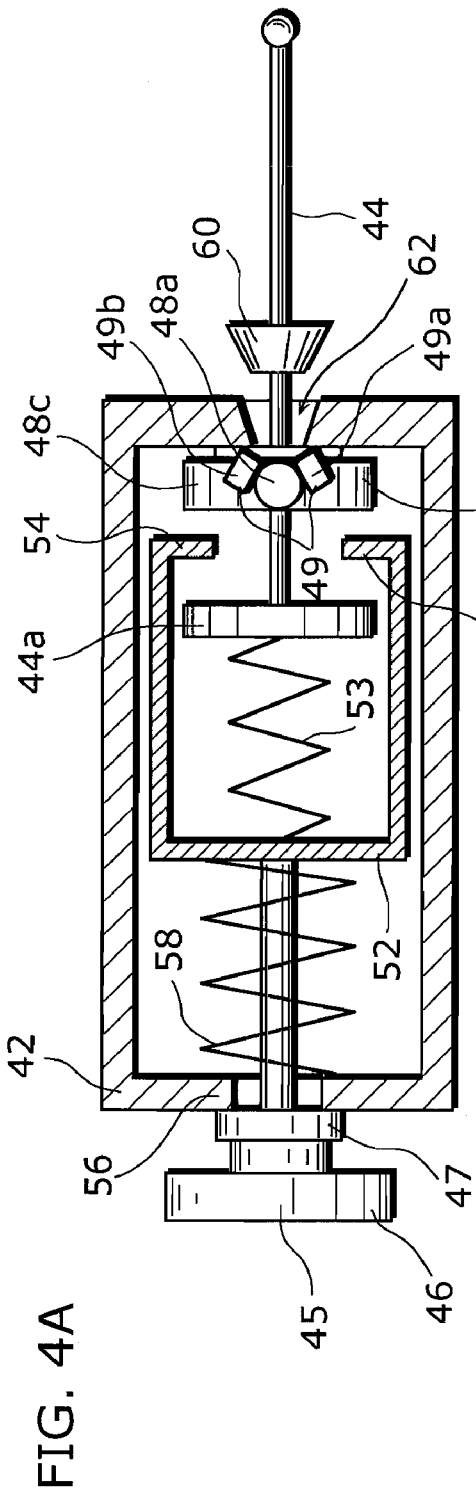
FIGS. 4A and 4B are diagrams showing, in comparison, the sensing state and the protected state of the sensor.
Figure 4B:
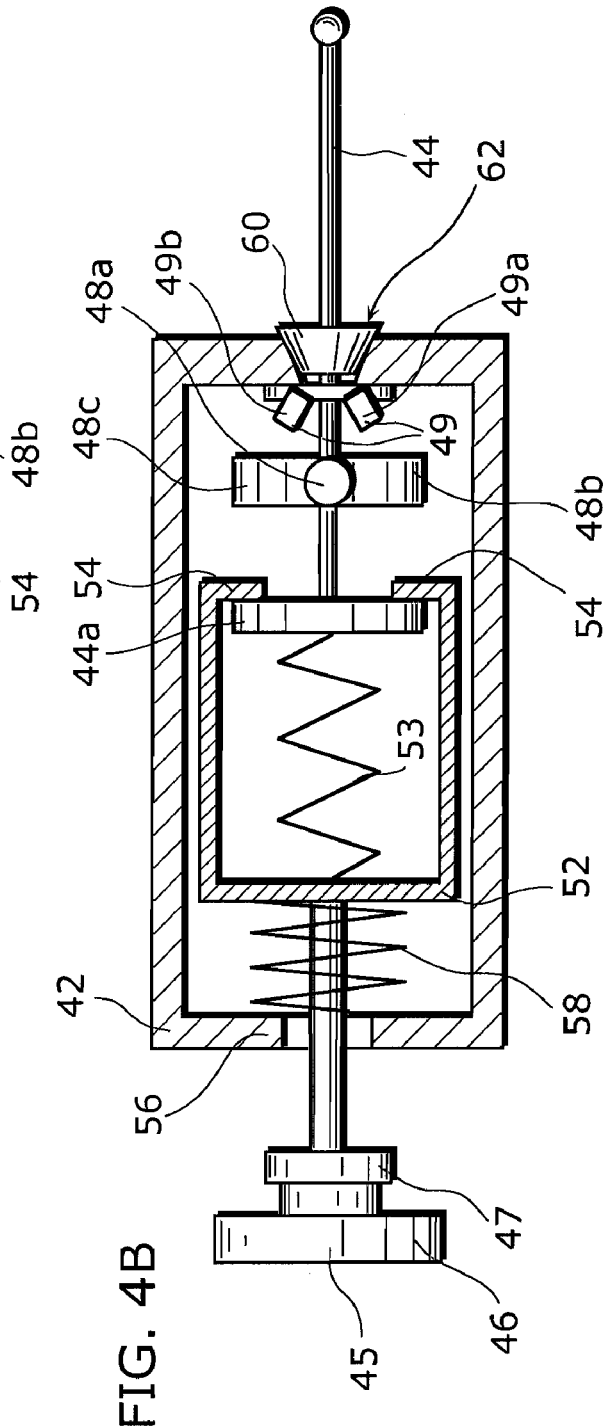

FIGS. 4A and 4B are diagrams showing, for comparison, the sensing state and the protected state of the sensor 40. FIG. 4A shows the sensing state, and FIG. 4B shows the protected state. The diagrams illustrate only the terminal 49, and the remaining terminals 50 and 51 have been omitted.

As shown in FIG. 4A, when the releasing unit 45 is in the sensing position, the releasing unit 45 such as the base plate 52 is located at a specified position with respect to the housing 42, and such position is held steady by the positioning flange biasing unit 58. In this state, the engaging claws 54 of the releasing unit 45 and the second engaging flange 44a are separated and the probe 44 is pushed by the probe biasing unit 53 so that the connector 48a comes into contact with the terminal 49.

Therefore, as described above, it is possible to sense slight contact between the probe 44 and the workpiece. However, in the state where the sensor is not in use, for example, collision between the connector 48a and the terminal 49 is repeated each time the turret tool post rotates since centrifugal force or acceleration causes the probe 44 to swing widely about the housing 42. Furthermore, when the vibration during the cutting of a workpiece by other cutting tools mounted on the turret tool post is amplified via the fitting equipment for mounting the sensor and transmitted to the sensor 40, the vibration causes the connector 48a and the terminal 49 to rub against each other.

Accordingly, the connector 48a and the terminal 49 are worn and the coefficient of static friction increases, and problems such as the sensor not reacting to slight contact between the probe and the workpiece arise.

Consequently, in the state in which the sensor 40 is not being used, the releasing unit 45 is brought to the release position, as shown in FIG. 4B. More specifically, the releasing unit 45 assumes an extracted state with respect to the housing 42. With this, the engaging claws 54 of the releasing unit 45 engage with the second engaging flange 44a causing the probe 44 to sink into the housing 42, and thus forcibly releasing the connection between the connector 48a and the terminal 49.

With this, even when some vibration is exerted on the sensor 40, the connector 48a and the terminal 49 are not worn away since the connector 48a and the terminal 49 are not made to rub against each other. In addition, since the holding member of the probe 44 and the holding cavity 62 of the housing 42 fit together, the probe 44 is held steady against the housing 42 and thus, even when the turret tool post rotates and centrifugal force or acceleration is exerted upon the sensor 40, the connector 48a and the terminal 49 do not collide violently with each other since the probe 44 does not sway about the housing 42.

Accordingly, it becomes possible to protect the sensor 40 and prolong the operational life of the sensor 40.

Figure 5:
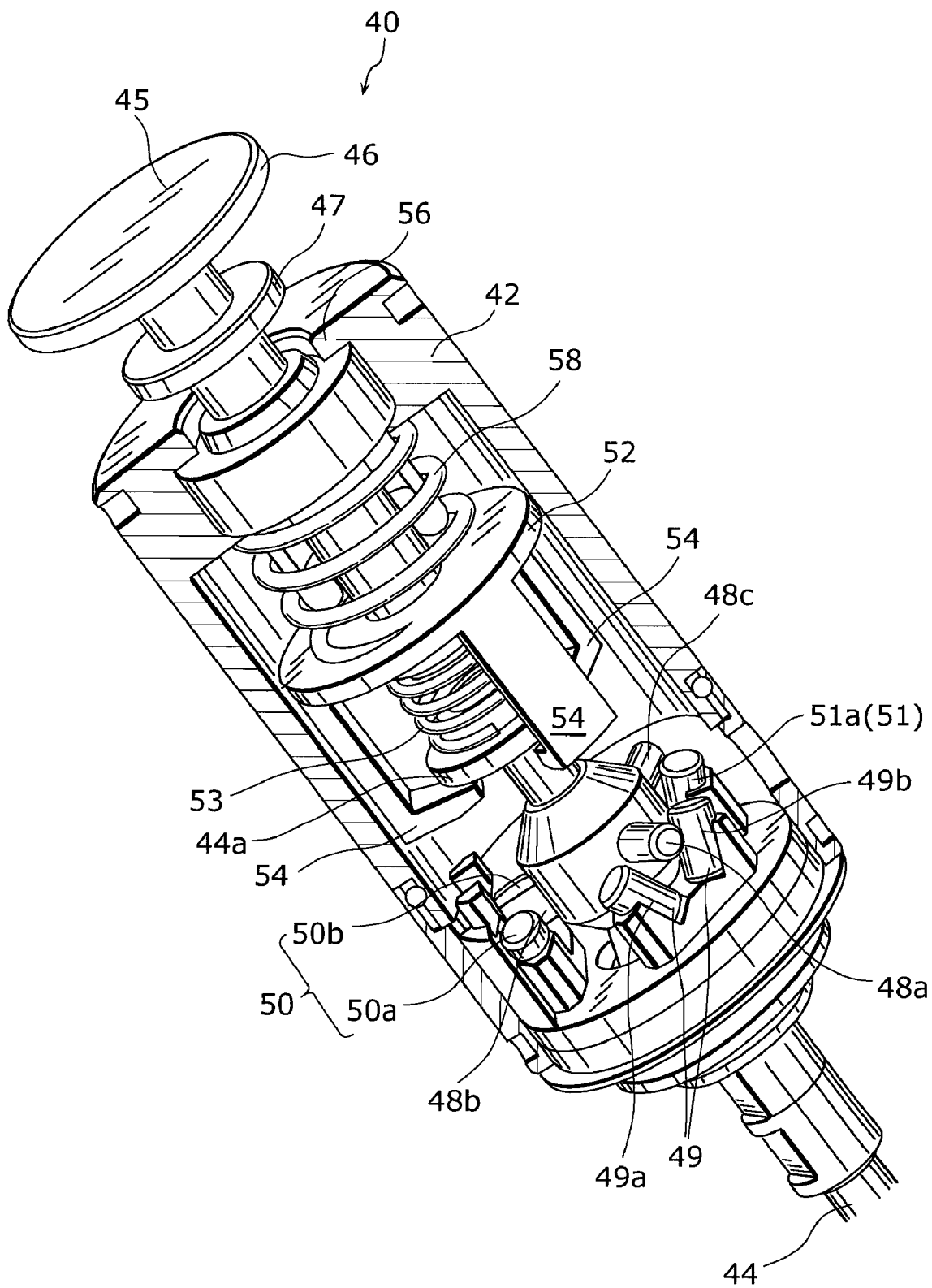
FIG. 5 is a perspective view showing the sensor in the protected state, with a part of the housing being cut out.

Note that FIG. 5 is a perspective view with a part of the housing being cut out, showing the sensor 40 in the protected state. Furthermore, FIG. 6 is a cross-section view of a part of the sensor 40 in the protected state.

Figure 6:
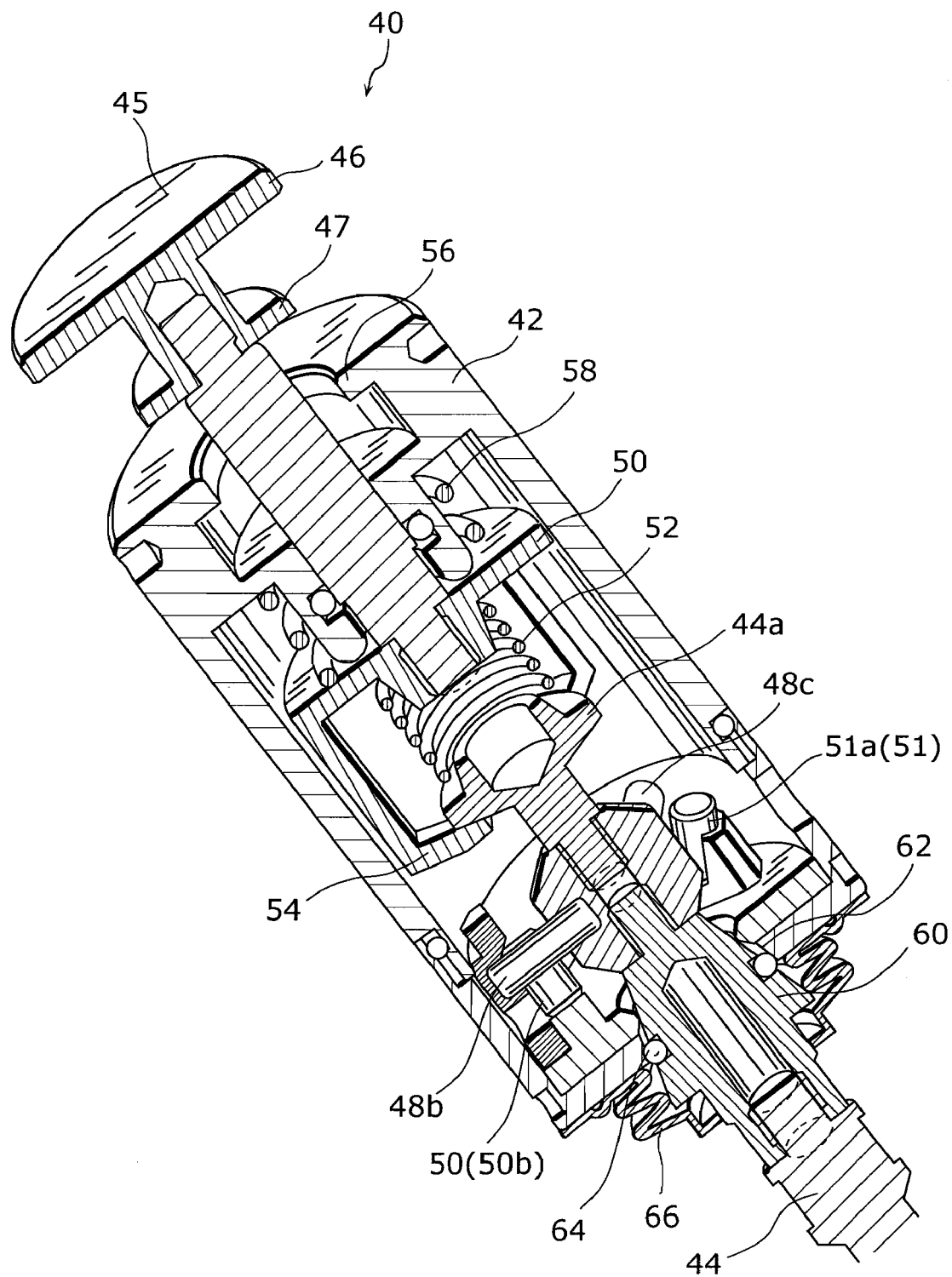
FIG. 6 is a cross-section view of a part of the sensor in the protected state.

As shown in FIG. 6, an O-ring 64, which serves as a cushioning member, is fitted to the holding member 60 and fills a gap arising when the holding member 60 and the holding cavity 62 fit together in the protected state. It should be noted that the cushioning member may also be fitted to the inner face of the rim of the holding cavity 62.

With this, it is possible to soften the impact between the probe 44 and the housing 42 during the change of states from the sensing state to the protected state. Furthermore, vibration of the probe 44 in the protected state can be suppressed. In addition, the intrusion of minute dust between the probe 44 and the housing 42 into the inside of the housing 42 can be prevented.

A protective cover 66 is configured of flexible accordion-shaped rubber which covers the holding member 60 of the probe 44 and the rim of the holding cavity 62.

With this, the intrusion of minute dust between the probe 44 and the housing 42 into the inside of the housing 42 can be prevented. Furthermore, since the protective cover 66 is in the form of an accordion, it does not interfere with the changing of states between the sensing state and the protected state. In addition, since it is made of a flexible material such as rubber, it has almost no impact on the tilting of the probe 44 during sensing. It should be noted that material of the protective cover 66 need not be limited to rubber as long as it is dust proof and flexible.

Next, the usage of the sensor 40 in the turret lathe and the transmission of motive power for bringing the sensor 40 into the protected state shall be described.

Figure 7:
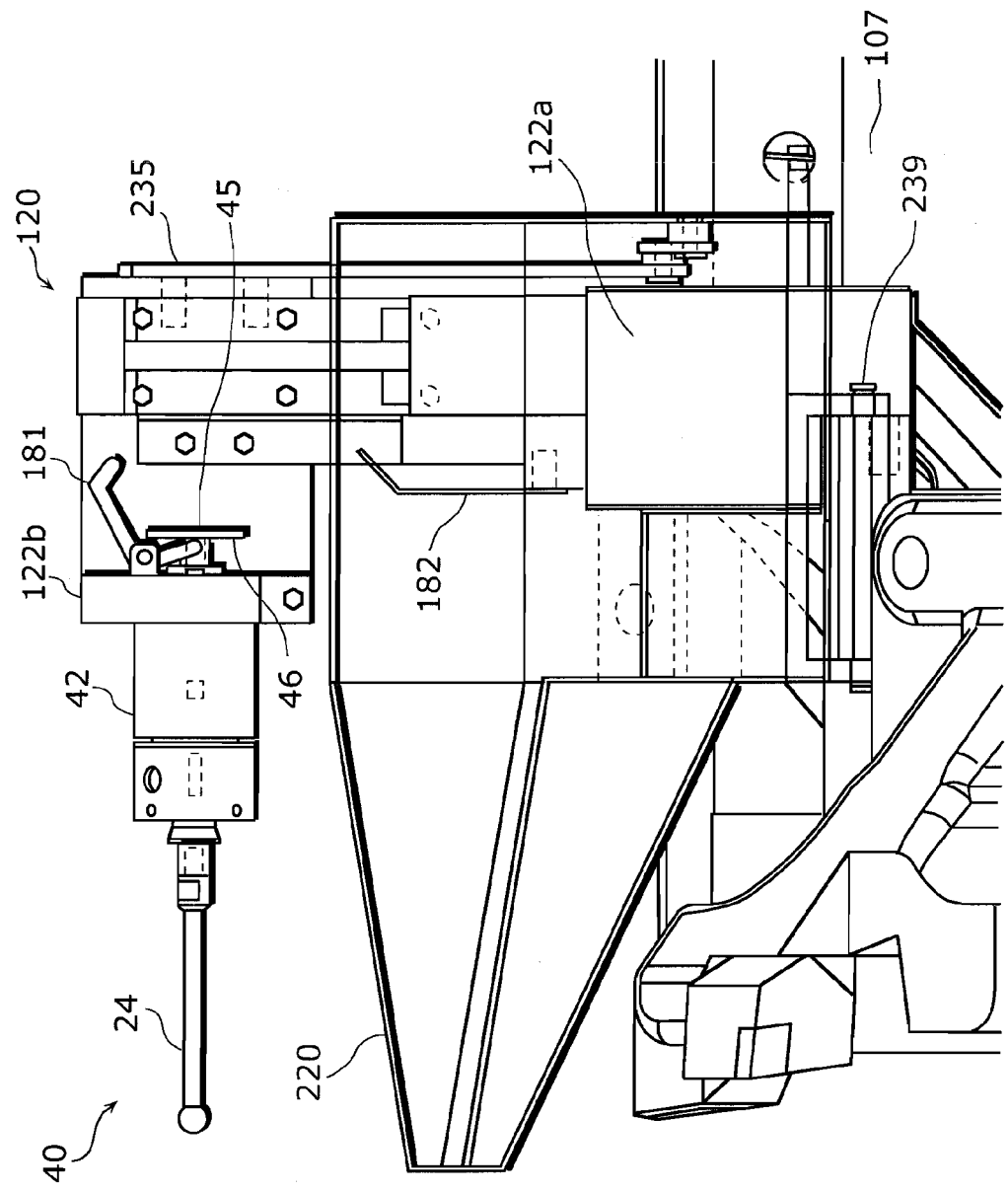
FIG. 7 a side view showing a sensor module having the sensor in the sensing state.

FIG. 7 a side view showing a sensor module having the sensor 40 in the sensing state.

Figure 8:
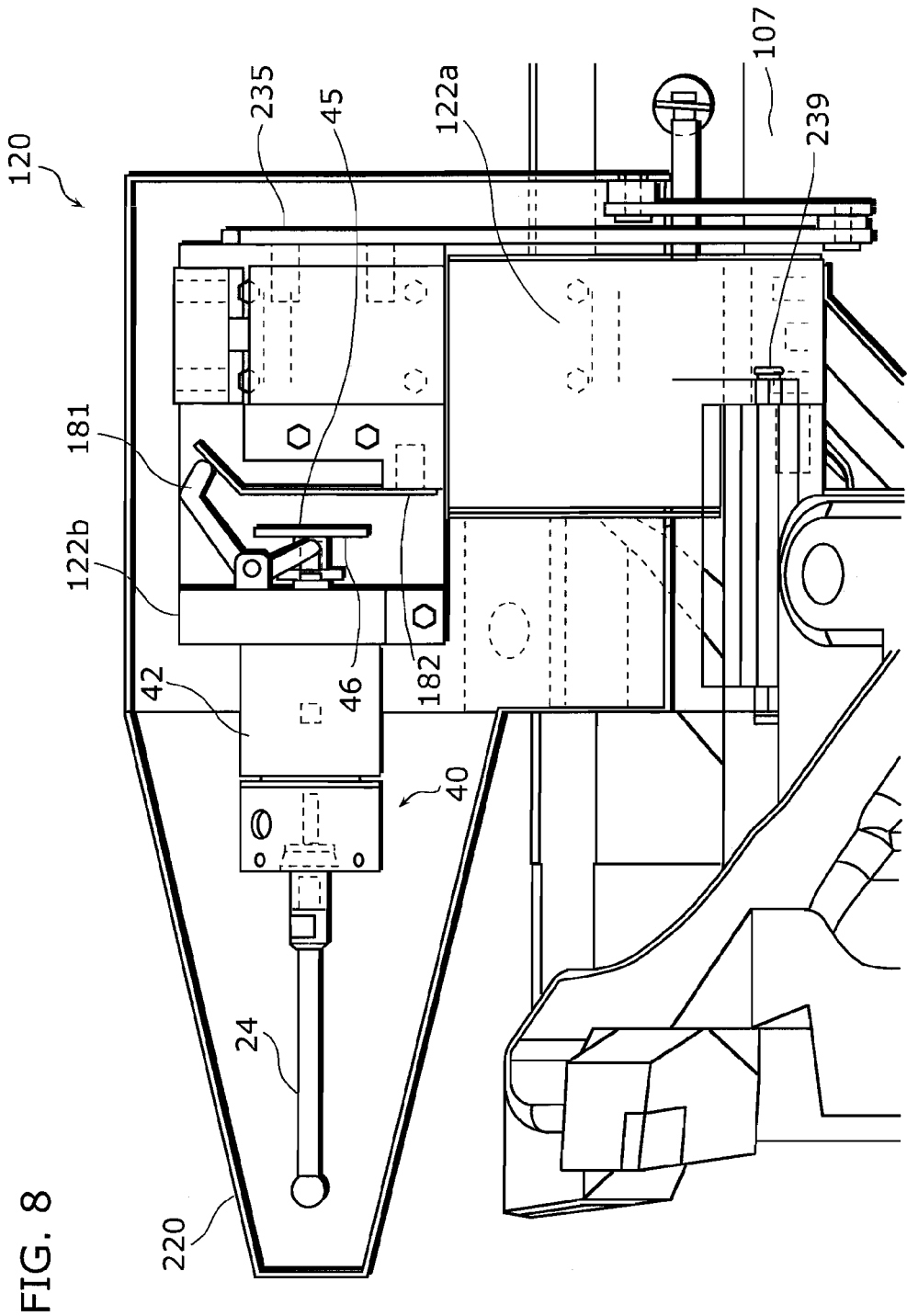
FIG. 8 a side view showing a sensor module having the sensor in the protected state.
Figure 9:
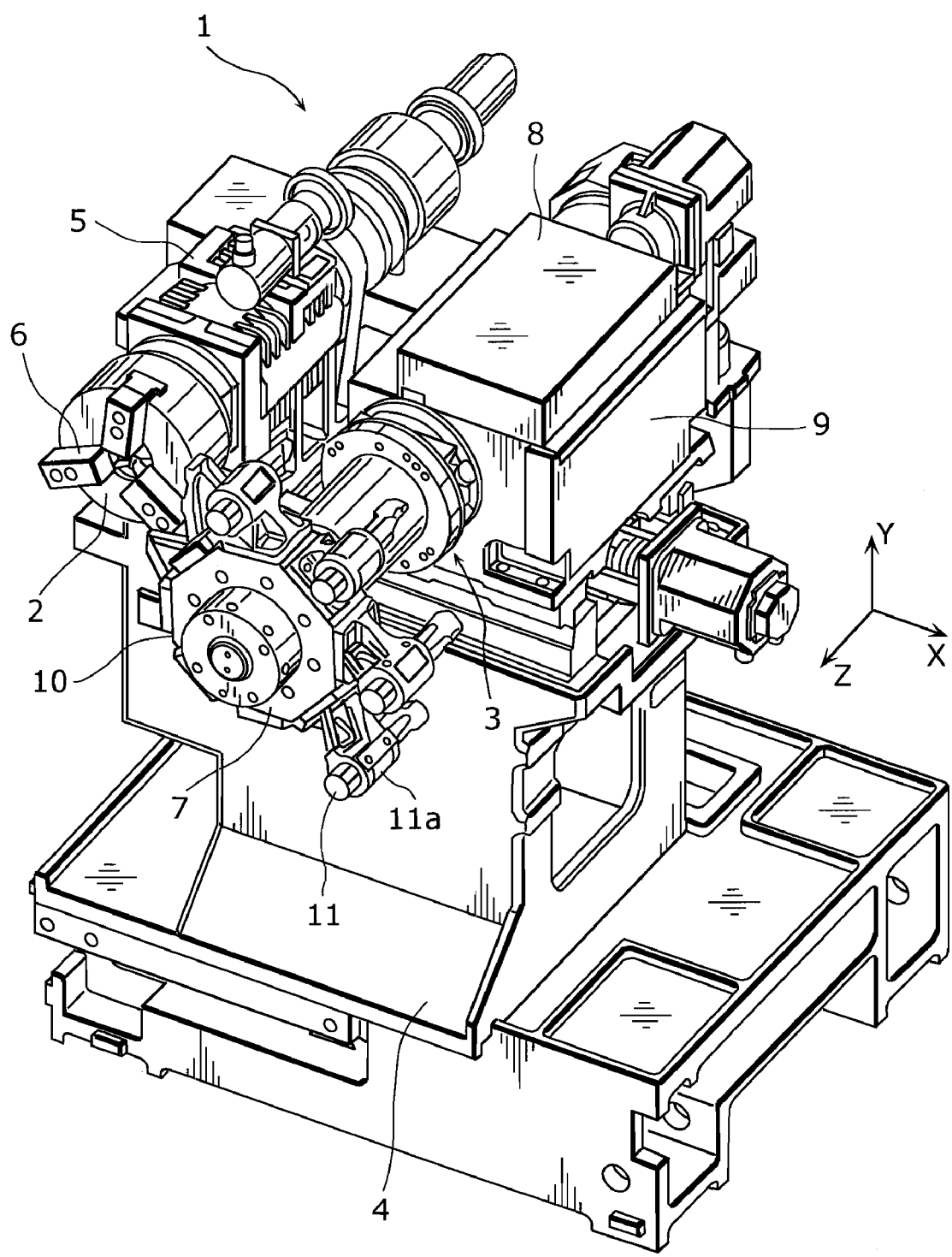
FIG. 9 is an external perspective view showing an example of a commonly-used conventional turret lathe.
Figure 10:
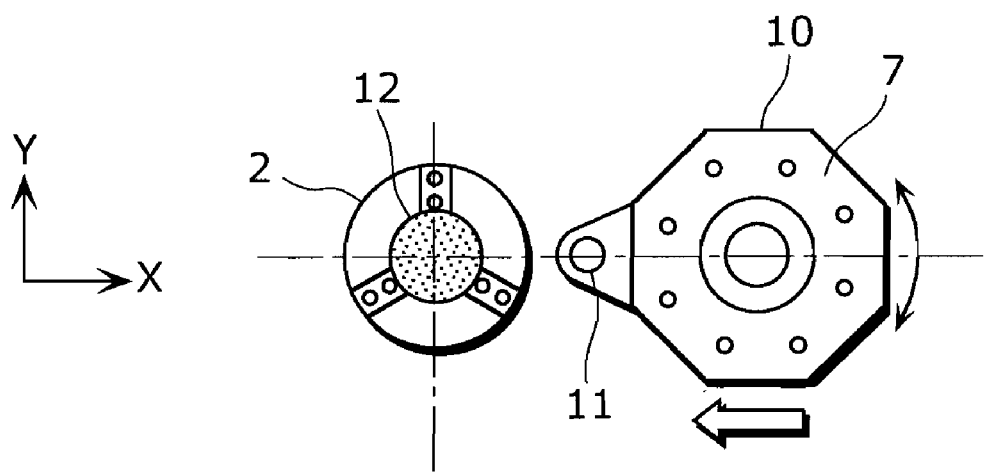
FIG. 10 is an elevation view showing a positional relationship between a turret tool post and a spindle of the turret lathe.
Figure 11:
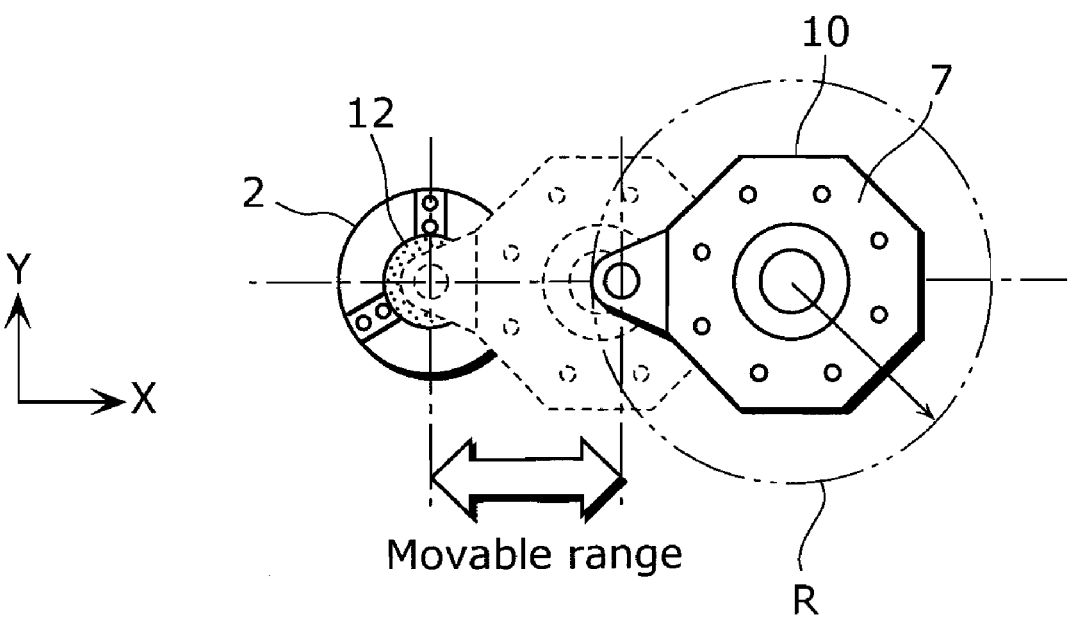
FIG. 11 is an elevation view showing the movable range of the turret tool post of the turret lathe.
Figure 12A:
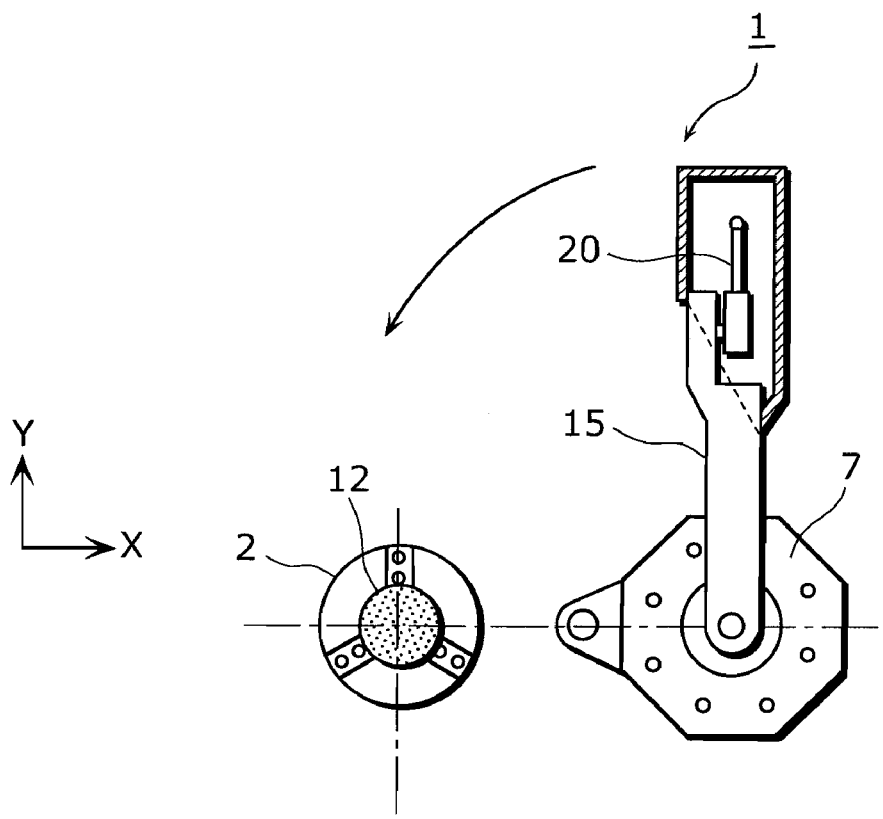
FIG. 12A is schematic diagram each showing an example of the conventional turret tool post having a mechanism for directly measuring the diameter of a workpiece.
Figure 12B:
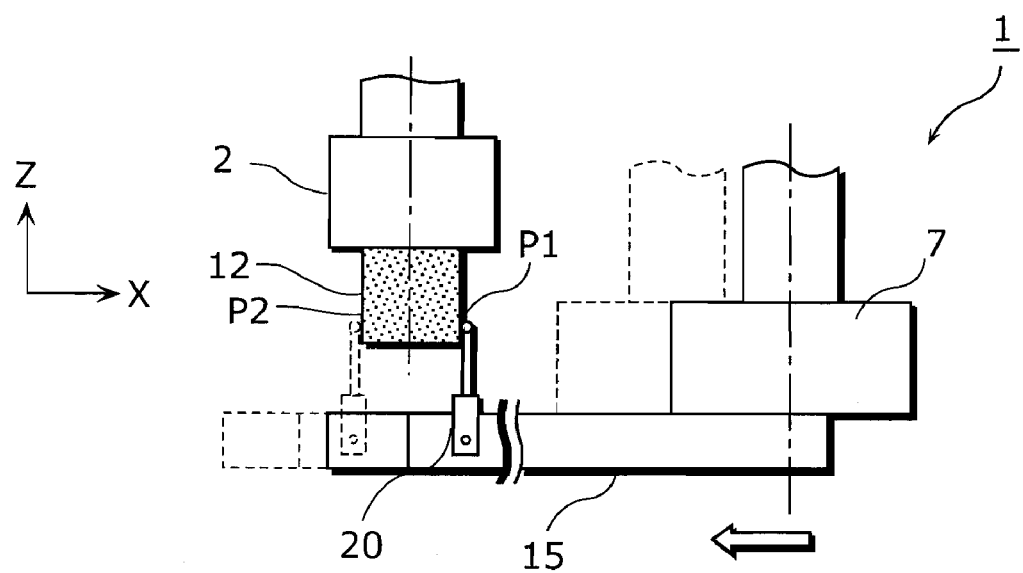
FIG. 12B is schematic diagram each showing an example of the conventional turret tool post having a mechanism for directly measuring the diameter of a workpiece.
Figure 13:
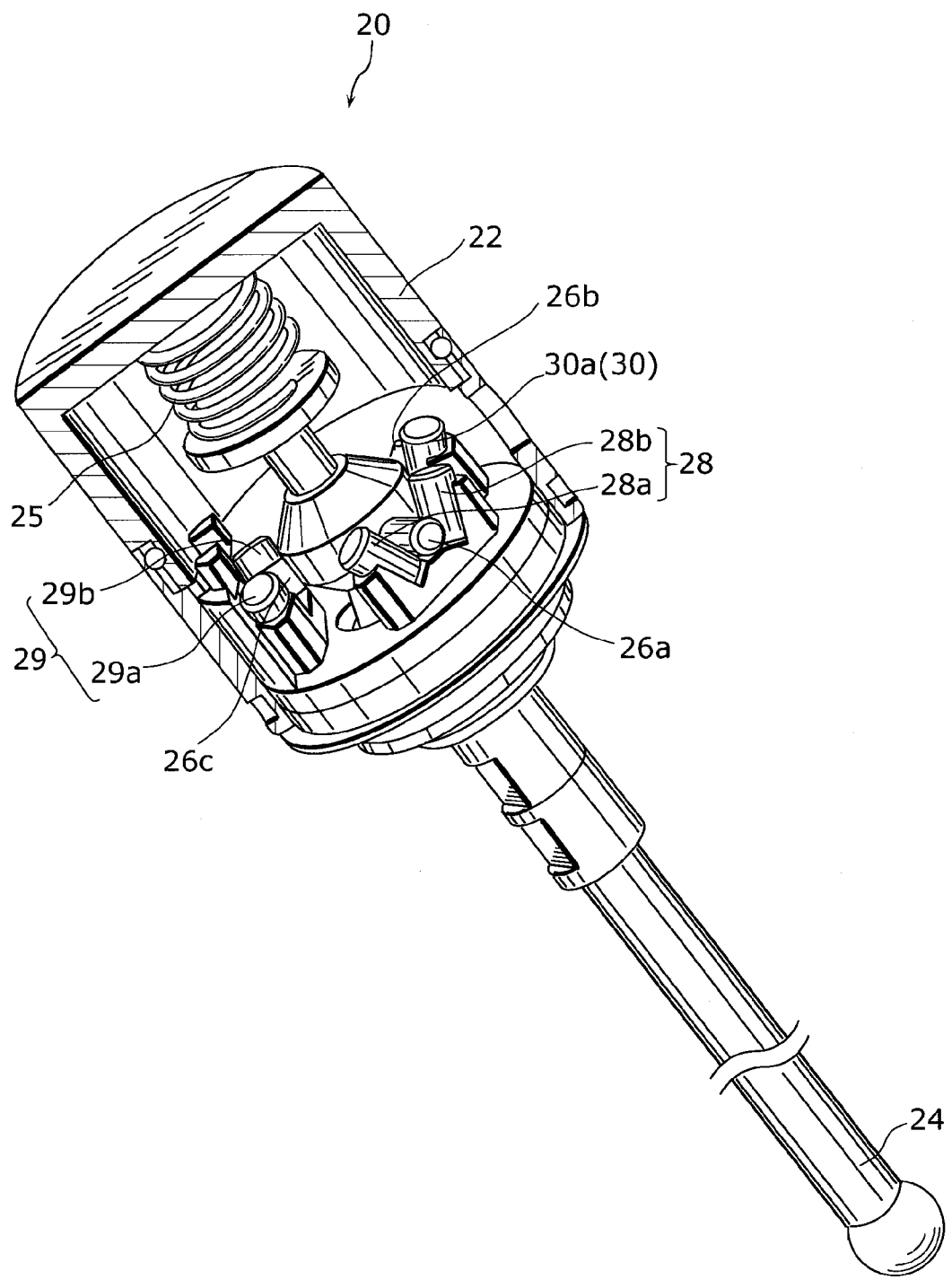
FIG. 13 is a cross-section view showing an example of the structure of a conventional sensor used in in-machine measurement.

FIG. 8 a side view showing a sensor module having the sensor 40 in the protected state.

In these diagrams, an example is shown in which a sensor module 120 having the sensor 40 is mounted on one of the tool holding faces of a turret tool post 107.

A sensor module 120 includes: a support strut 122 having a mechanism that extends and retracts radially of the turret tool post 107 and equipment for fitting onto a tool holding face of the turret tool post 107; the sensor 40 for measuring the dimension of the workpiece; and a cover 220 which covers the sensor 40 in the protected state.

In other words, the sensor 40 is mounted on the turret tool post 107 as though it is a tool.

The sensor 40 is mounted on a support strut head 122b, perpendicularly to the direction of extension and retraction.

Furthermore, a lever member 181 is rotatably mounted, via a rotation shaft, to a part of the of the support strut head 122b which corresponds to the first engaging flange 46 included in the sensor 40. One end of the lever member 118 can come into contact with the first engaging flange 46 from the housing 42-side.

On the other hand, a plate-shaped cam member 182 is mounted on a support strut base 122a. The cam member 182 is a member which comes into contact with the other end of the lever member 181 which comes closer as the support strut head 122b retracts, and which has rigidity and a form that can push out the other end of the lever member 181 to the housing 42-side (refer to FIG. 8).

As described above, the support strut 122 includes the lever member 181 and the cam member 182. When the support strut 122 is in the extended state, that is, when sensing by the sensor 40 is required, the lever member 181 and the cam member 182 are positioned so that motive force is not transmitted to the releasing unit 45. Therefore, the releasing unit 45 is held steady in the sensing position by the biasing force of the positioning flange biasing unit 58, and the sensor 40 assumes the sensing state.

On the other hand, when the support strut 122 is in the retracted state, that is, when there is a need to protect the sensor 40 from vibration and the like, the lever member 181 and the cam member 182 assume a position which allows transmission of motive force to the releasing unit 45, and the motive power of an air cylinder (not shown) is transmitted to the releasing unit 45 via the lever member 181. Therefore, the releasing unit 45 is extracted with respect to the housing 42. In other words, the releasing unit 45 is placed in the protected position in conjunction with the retraction of the sensor module 120.

By adopting the above-described structure, the extension and retraction of the extension and retraction mechanism included in the sensor module 120 and the switching between the sensing state and the protected state of the sensor 40 can be carried out simultaneously using one air cylinder.

Furthermore, the cover 220 is rotatably mounted on equipment for fitting to a tool holding face of the support strut 122, though a support shaft 239. The cover 220 includes a mechanism which opens and closes in conjunction with the changing between the sensing state and the protected state by the sensor 40, and opens in the sensing state and closes in the protected state. This protects the sensor 40 which is in the protected state.

Although a sensor in an embodiment of the present invention has been described thus far, the present invention is not limited to such embodiment. Those skilled in the art will readily appreciate that many modifications are possible in the exemplary embodiment without materially departing from the novel teachings and advantages of this invention. Accordingly, all such modifications are intended to be included within the scope of this invention.

For example, although the holding member 60 in the embodiment is a circular truncated cone which fits together with the holding cavity 62, the holding member 60 may have a disc-shape with a radius larger than the holding cavity 62. In this case, movement of the probe 44 in the protected state is suppressed through the frictional force between the mutually contacting parts of the disc-shaped holding member 60 and the rim of the holding cavity 62.

INDUSTRIAL APPLICABILITY

The sensor according to the present invention can be used in a sensor which senses contact with an object, and can be used as a sensor used in machine tools such as a turret lathe or a machining center, which senses contact with a workpiece.

What is claimed is:

1. A sensor which senses contact with an object through tilting of a probe having a rod shape, said sensor comprising:
   a housing;
   said probe arranged to project from an inside of said housing to an outside of said housing, and capable of reciprocating and tilting with respect to said housing;
   connectors fixed to a part of said probe, which is located inside said housing;
   terminals fixed to positions inside said housing that come into contact with said connectors, and which conduct electricity through the contact with said connectors;
   a probe biasing unit configured to force said probe along a direction of the reciprocation so that said connectors come into contact with said terminals; and
   a releasing unit configured to release the contact between said connectors and said terminals brought upon by said probe biasing unit.

2. The sensor according to claim 1,
   wherein said connectors are fixed to project outward in a radial pattern, with an axis of said probe as a center, and
   each of said terminals is made up of a pair of columnar conductors which are insulated from each other, each of the pair of conductors conducting electricity via one of said connectors through contact with said one connector.

3. The sensor according to claim 2, further comprising:
   a base which can reciprocate inside said housing; and
   a locking unit provided in said housing, and configured to lock said base to a first position,
   wherein said connectors are three in number,
   three of said terminals are respectively fixed to positions at which a corresponding one of said connectors comes into contact, each of said terminals being provided in a V-shape,
   said probe biasing unit is an elastic body and is configured to connect said base and said probe, and to restrain the tilting of said probe with respect to said base when said base is locked by said locking unit,
   said releasing unit is configured to switch a position of said base along a direction of the reciprocation, between the first position and a second position which releases the restraint on the tilting of said probe and the contact between said connectors and said terminals, and
   said base has engaging claws which do not interfere with the tilting of said probe when said base is in the first position, and which engage with said probe when the position of said base is switched from the first position to the second position by said releasing unit.

4. The sensor according to claim 3,
   wherein said probe has a holding member which engages with a rim of a holding cavity of said housing and holds said probe, when the position of said base is switched to the second position by said releasing unit.

5. The sensor according to claim 4,
   wherein said holding member is a tapered member which fits together with said holding cavity.

6. The sensor according to claim 5,
   wherein at least one of said holding cavity and said holding member has a cushioning member which fills a gap arising when said holding cavity and said holding member fit together.

* * * * *